United States Patent
Lin et al.

(10) Patent No.: US 7,440,203 B2
(45) Date of Patent: Oct. 21, 2008

(54) PROJECTION LENS

(75) Inventors: Ching-Min Lin, Hsinchu (TW); Nien-Tsung Hsu, Hsinchu (TW); Ken-Chiang Chun, Hsinchu (TW); Wei-Ming Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/754,374

(22) Filed: May 29, 2007

(65) Prior Publication Data
US 2008/0019027 A1    Jan. 24, 2008

(30) Foreign Application Priority Data
Jul. 19, 2006    (TW) .............. 95126330 A

(51) Int. Cl.
*G02B 7/02* (2006.01)
(52) U.S. Cl. ............................ 359/825; 359/824
(58) Field of Classification Search .......... 359/824, 359/825
See application file for complete search history.

(56) References Cited

U.S. PATENT DOCUMENTS 4,154,510 A *  5/1979  Katagiri ............... 359/826
5,218,479 A *  6/1993  Chiou et al. ........... 359/700
2002/0118468 A1*  8/2002  Shirota ................. 359/699
2007/0115566 A1*  5/2007  Miyazawa et al. ..... 359/811

FOREIGN PATENT DOCUMENTS

TW    236573    7/2005

\* cited by examiner

*Primary Examiner*—Jordan M. Schwartz
*Assistant Examiner*—James C Jones
(74) *Attorney, Agent, or Firm*—Jianq Chyun IP Office

(57) ABSTRACT

A projection lens including a front sleeve, a rear sleeve, a main sleeve, a driving ring, sliding components and lenses is provided. The main sleeve covers the front sleeve and the rear sleeve. The driving ring covers the front sleeve and the main sleeve. The sliding component is assembled to the driving ring. The lenses are disposed inside the front sleeve and the rear sleeve. The front sleeve has grooves and a first guiding part outside. The main sleeve has first threads and a second guiding part. Furthermore, the second guiding part engages with the first guiding part and the first threads on the main sleeve mesh with a plurality of second threads on the driving ring. The sliding components protrude from the driving ring into the grooves. When the driving ring rotates, the sliding components slide in the grooves and push the front sleeve along an axis to reciprocate.

9 Claims, 5 Drawing Sheets

PROJECTION LENS

CROSS-REFERENCE TO RELATED APPLICATION

This application claims the priority benefit of Taiwan application serial no. 95126330, filed Jul. 19, 2006. All disclosure of the Taiwan application is incorporated herein by reference.

BACKGROUND OF THE INVENTION

1. Field of the Invention

The present invention relates to a lens, and more particularly, to a projection lens.

2. Description of Related Art

Most projection apparatus utilizes an optical engine to convert a light beam emitted from a light source into an image and projects the image beam onto a screen through a projection lens so as to display an image. Therefore, the quality of the projected image from a projection apparatus is closely related to the optical engine and the projection lens.

FIGS. 1A and 1B are perspective view of a camera lens assembly 100 disclosed in R.O.C patent No. 1236573. The camera lens assembly 100 includes a bracket 110, a zooming ring 120, a front sleeve 130, a lens 140 and an elastic component 150. The bracket 110 has a plurality of inclined grooves 112 and a plurality of hook arms 114. The zooming ring 120 has a plurality of protrusions 122 and an inner spiral 124. The front sleeve 130 has an outer spiral 132. When the zooming ring 120 is assembled to the bracket 110, each protrusion 122 of the zooming ring 120 is located inside one of the inclined grooves 112 of the bracket 110. After engaging the outer spiral 132 of the front sleeve 130 to the inner spiral 124 of the zooming ring 120, the front sleeve 130 is accommodated inside the zooming ring 120. Furthermore, the lens 140 is disposed inside the front sleeve 130. The elastic component 150 is pressed against the front sleeve 130 and the hook arms 114 of the bracket 110 hook onto the elastic component 150.

As shown in FIG. 1B, when the protrusions 122 of the zooming ring 120 slide along the inclined groove 112, the zooming ring 120 rotates relative to the bracket 110. During the duration of rotation, the zooming ring 120 moves up or down to adjust the focus of the camera lens assembly 100.

However, the camera lens assembly 100 is mainly designed for a camera. If we want to apply the camera lens assembly 100 to a projection apparatus having aspherical lens, because the front sleeve 130 incorporating the aspherical lens rotates synchronously with the movement of the front sleeve 130 in the axial direction, the quality of image projected from the projection apparatus is compromised. To prevent the deterioration of the image quality from a projection apparatus due to the rotation of the aspherical lens, a projection lens with a non-rotational front sleeve is proposed. FIG. 2 is an explosion view showing the major components of a conventional projection lens.

As shown in FIG. 2, the conventional projection lens 200 includes a front sleeve 210, a rear sleeve 220, a main sleeve 230, a metal ring 240, a plurality of lenses 250, an adjusting rod 260, three screws 270 and anther three screws 280. The front sleeve 210 has three threaded holes 212, the rear sleeve 220 has one threaded hole 222. The main sleeve 230 has a straight groove 232, three threaded holes 234 and three grooves 236. The metal ring 240 has three lateral grooves 242 and three inclined grooves 244. The lenses 250 are disposed inside the front sleeve 210 and the rear sleeve 220 respectively.

The main sleeve 230 covers the front sleeve 210 and the groove 236 exposes the threaded hole 212. The main sleeve 230 also covers the rear sleeve 220 and a part of the rear sleeve 220 exposes outside the main sleeve 230. The straight groove 232 exposes the threaded hole 222. The adjusting rod 260 penetrates through the straight groove 232 and locks inside the threaded hole 222. The metal ring 240 connects with the main sleeve 230 and the front sleeve 210. The lateral groove 242 exposes the threaded holes 234. The three screws 270 penetrate through the lateral groove 242 and lock inside the threaded holes 234. The inclined grooves 244 expose the grooves 236 and the threaded holes 212. Therefore, each screw 280 penetrates through one of the inclined grooves 244 and the grooves 236 and locks inside one of the threaded holes 212.

The direction of extension of the grooves 236 of the main sleeve 230 is parallel to an axis A of the main sleeve 230, the screws 280 is constrained by the grooves 236. Therefore, when the metal ring 240 rotates, the front sleeve 210 is only pushed along the axis A of the main sleeve 230 without rotating the front tube 210. As a result, the projection apparatus can project a clear image on a screen. However, the projection lens 200 uses a total of 7 locking elements (the adjusting rod 260, the three screws 270 and the three screws 280) for the assembly so that considerable time and cost is wasted in assembling the projection lens 200. Moreover, most manufacturers prefer to engage the screws 270, 280 with a sleeve for providing a better locking effect. Consequently, the assembling process is even longer and the cost of producing the projection lens 200 is even higher.

Furthermore, the presence of the lateral grooves 242 and the inclined grooves 244 on the metal ring 240 demands the metal ring 240 to be fabricated using a metal with a higher mechanical strength to reduce the degree of deformation when the metal ring 240 is worked on. However, the selection of a high-strength metal will increase the production cost.

Because a total of 6 grooves are formed on the metal ring 240, deformation problem is a still a major concern even if a high-strength metal is used to fabricate the metal ring 240. Moreover, the sharp edges of the lateral grooves 242 and the inclined grooves 244 often prevent the metal ring 240 from rotating smoothly after the metal ring 240 is assembled to the main sleeve 230. In addition, the metal ring 240 may scratch the surface of the main sleeve 230 causing surface abrasion of the main sleeve 230.

SUMMARY OF THE INVENTION

Accordingly, the present invention is directed to provide a projection lens capable of reducing assembling time and cost.

As embodied and broadly described herein, the invention provides a projection lens including a front sleeve, a rear sleeve, a main sleeve, a driving ring, a plurality of driving components and a plurality of lenses. The front sleeve has a plurality of grooves and a first guiding part. The grooves and the first guiding part are located on an outer surface of the front sleeve. The main sleeve covers the front sleeve and the rear sleeve. The main sleeve has a plurality of first threads and a second guiding part. The first threads are disposed on an outer surface of the main sleeve and the second guiding part is located on an inner surface of the main sleeve. Moreover, the second guiding part engages with the first guiding part so that the front sleeve can reciprocate along an axis of the main sleeve without rotation. The driving ring covers the front sleeve and the main sleeve. The driving ring has a plurality of second threads and the second threads are located on an inner surface of the driving ring to mesh with the first threads. The sliding components are assembled to the driving ring. The sliding components protrude from the driving ring into the groove. When the driving ring rotates, the sliding components slide inside the grooves of the front sleeve and push the front sleeve along the axis to reciprocate. The lenses are disposed inside the front sleeve and the rear sleeve.

In the projection lens of the present invention, the first guiding part and the second guiding part are designed to significantly reduce the assembling time. Moreover, the second threads on the driving ring and the first threads on the main sleeve are designed to smoothly rotate the driving ring. Furthermore, the driving ring can be fabricated using a plastic mold injection method to reduce production cost and increase throughput. Additionally, because the lens sleeve in the present invention can be fabricated by injection molding using plastic material, no additional process or treatment is needed. Hence, deformation problem is avoided and the reliability of the lens sleeve is improved. The present invention may further include a stopper. The stopper not only constrains the range of movement of the sliding component, but also reinforces the structure of the front sleeve. Moreover, the number of locking elements used to fabricate the projection lens is smaller than that of the conventional design. Hence, the cost of producing the locking elements and the time needed to lock up the locking elements are reduced.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
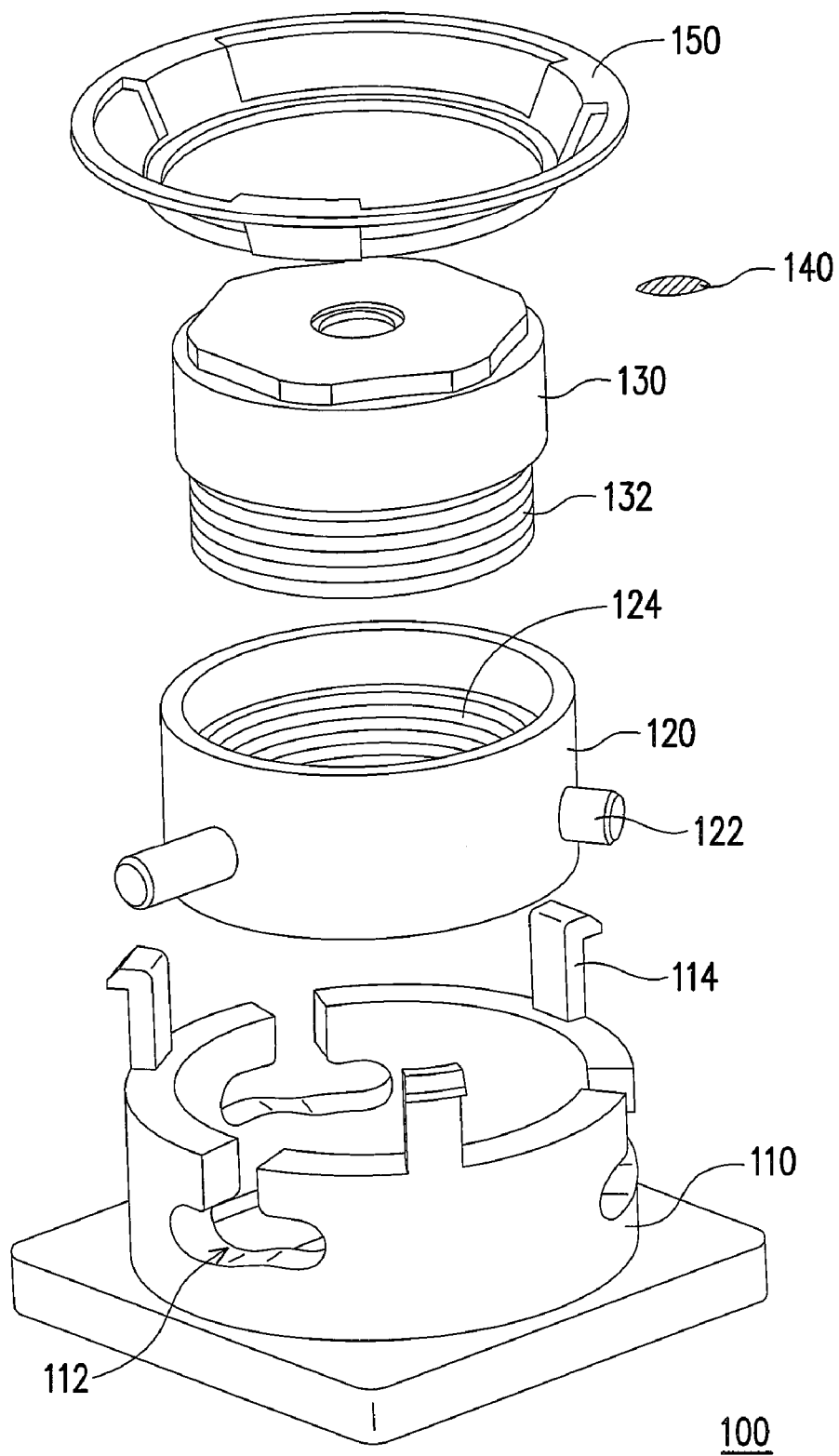
FIG. 1A is a diagram showing the components constituting a conventional camera lens.
Figure 1B:
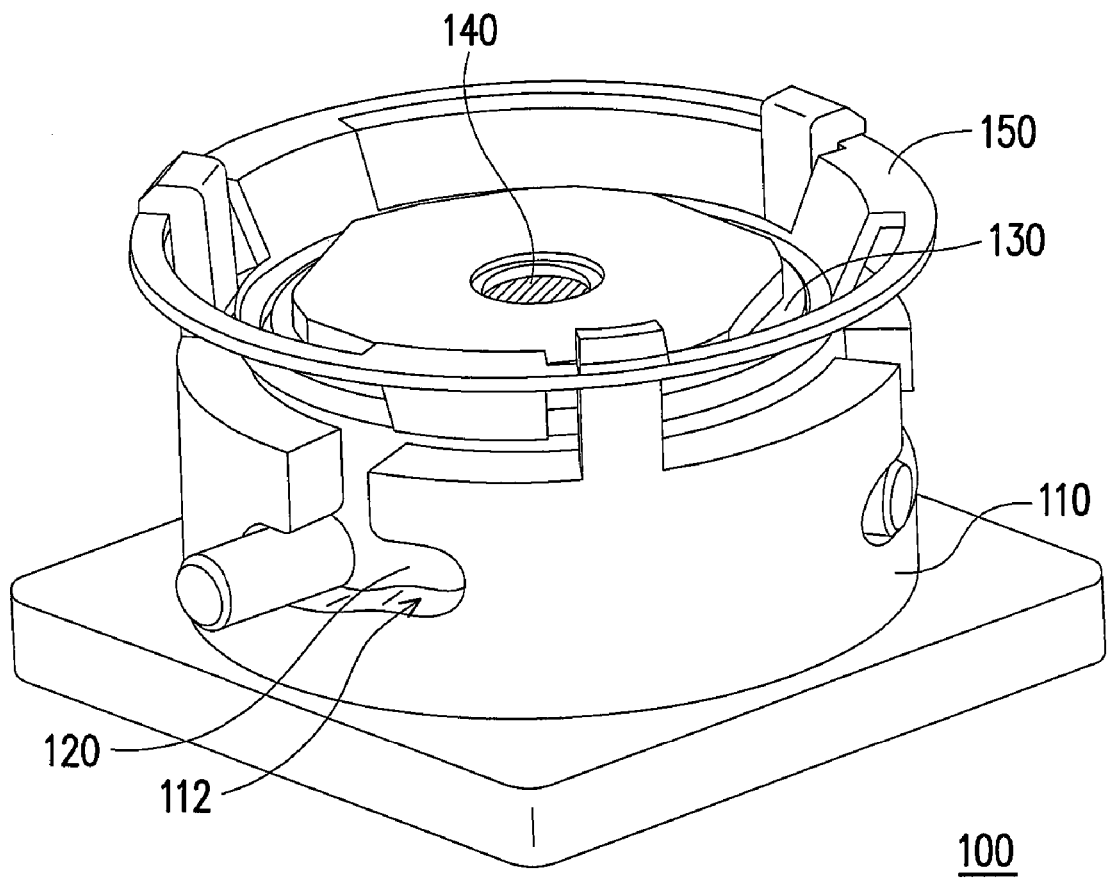
FIG. 1B is a diagram showing a conventional camera lens assembled using the components in FIG. 1A.
Figure 2:
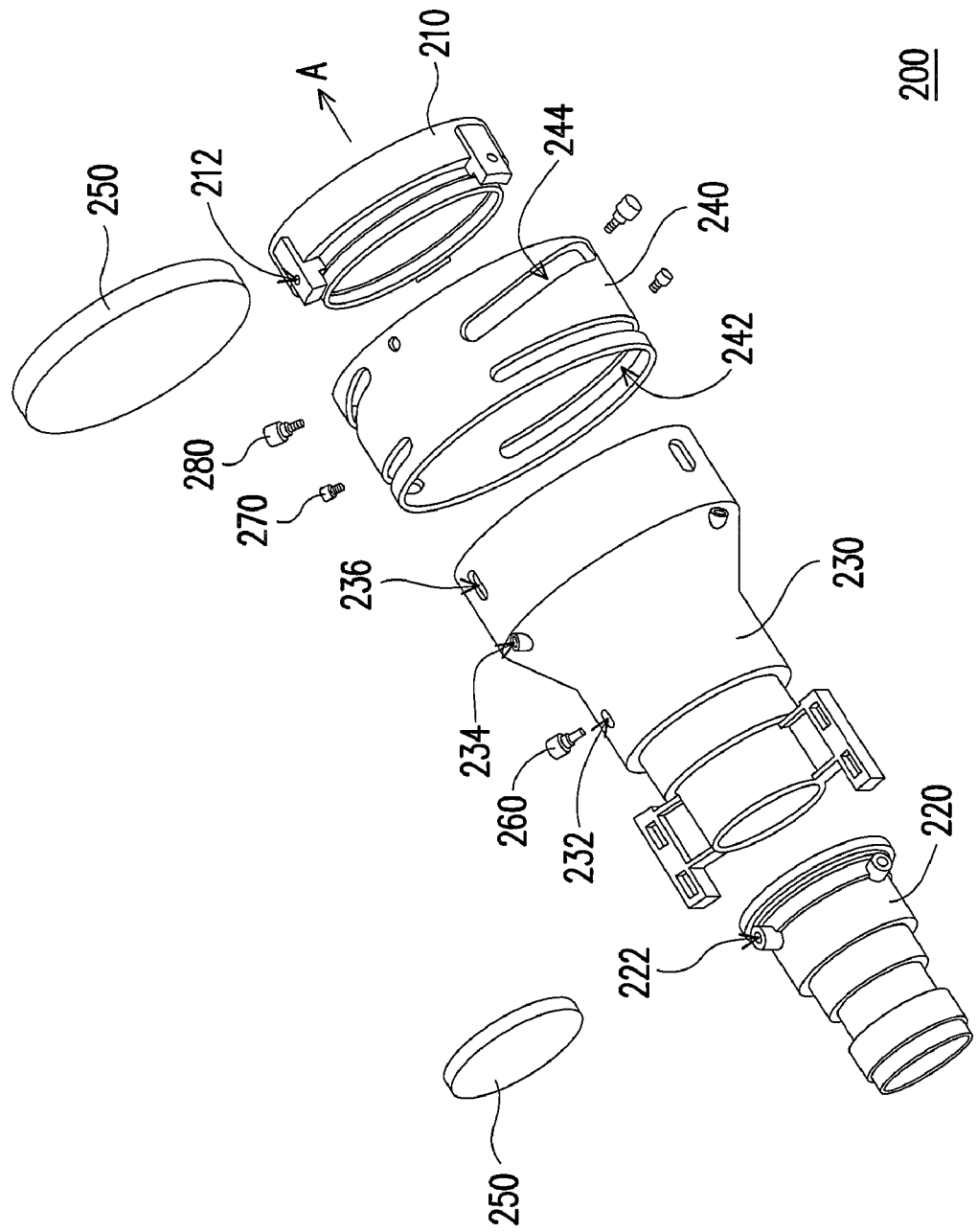
FIG. 2 is a diagram showing the components constituting a conventional projection lens.
Figure 3A:
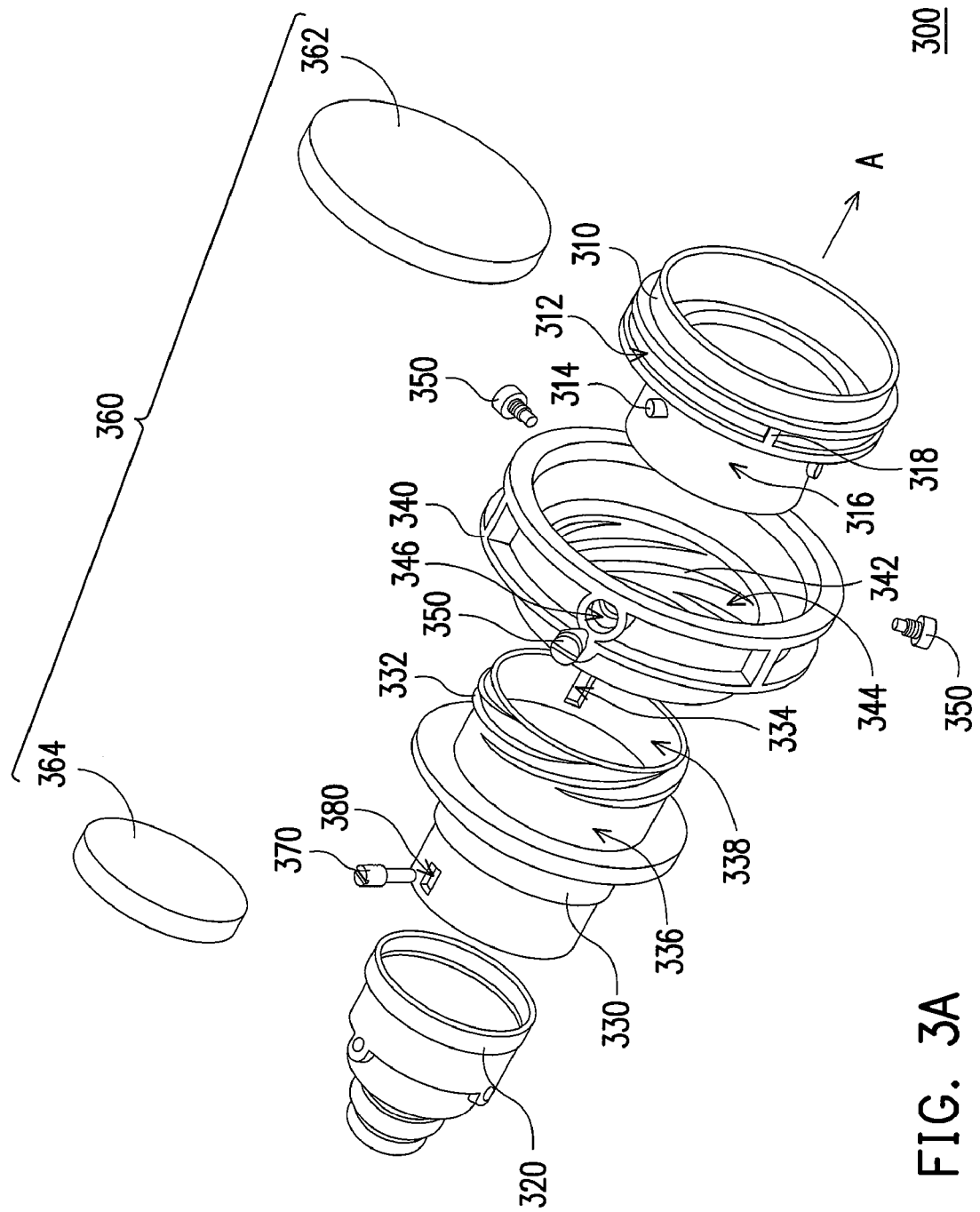
FIG. 3A is a diagram showing the components constituting a projection lens according to the present invention.
Figure 3B:
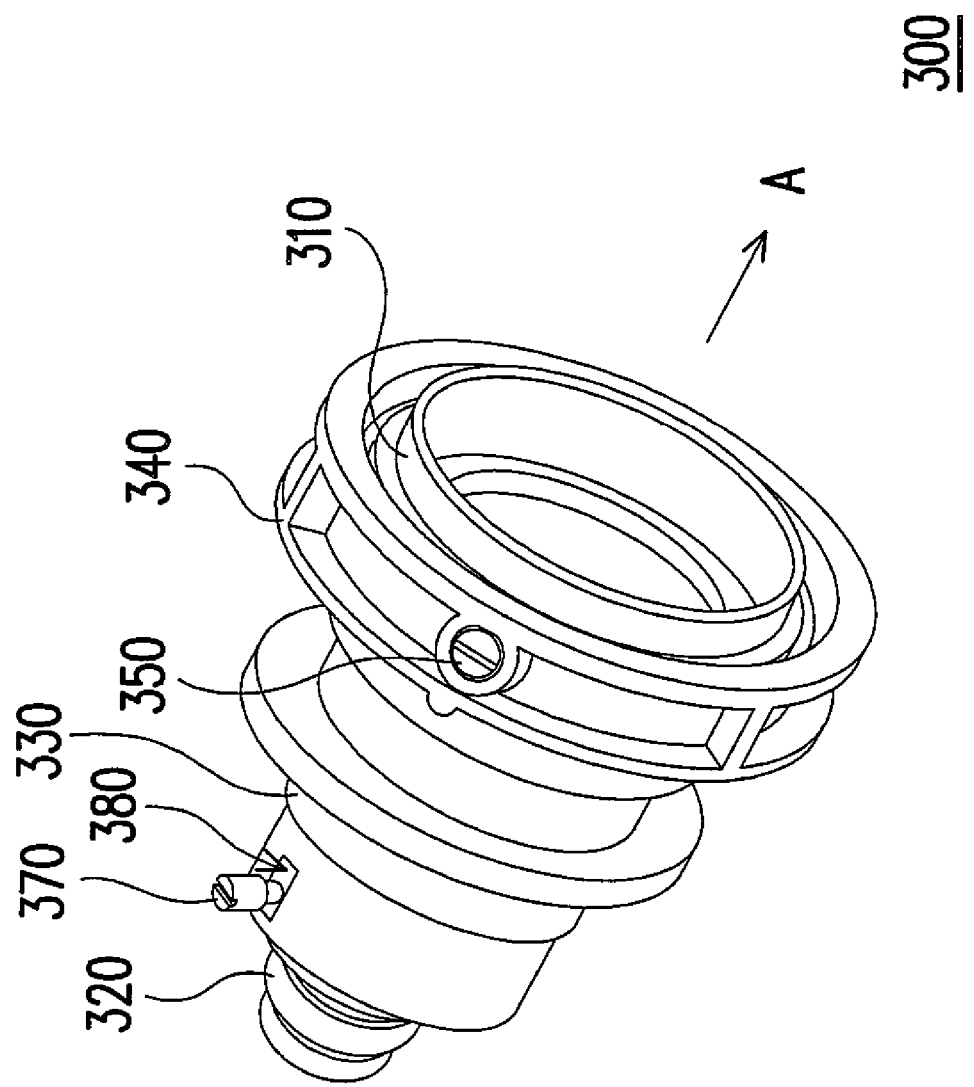
FIG. 3B is a diagram showing a projection lens assembled using the components in FIG. 3A.

As shown in FIGS. 3A and 3B, the projection lens 300 in the present invention includes a front sleeve 310, a rear sleeve 320, a main sleeve 330, a driving ring 340, a plurality of sliding components 350 and a plurality of lenses 360. The front sleeve 310 has an outer surface 316 with a plurality of grooves 312 and a first guiding part 314 formed thereon. The main sleeve 330 covers the front sleeve 310 and the rear sleeve 320. Furthermore, the main sleeve 330 has a plurality of first threads 332 on an outer surface 336 thereof and a second guiding part 334 on an inner surface 338 thereof. The second guiding part 334 engages with the first guiding part 314 so that the front sleeve 310 can reciprocate along an axis A of the main sleeve 330 without rotating the front sleeve 310. The driving ring 340 covers the front sleeve 310 and the main sleeve 330. The driving ring 340 has a plurality of second threads 342 that are formed on an inner surface 344 of the driving ring 340 and mesh with a plurality of first threads 332 on the main sleeve 330. The sliding components 350 are assembled to the driving ring 340. Moreover, one end of the sliding components 350 protrudes into the grooves 312 of the front sleeve 310. When the driving ring 340 rotates, the sliding components 350 slide inside the grooves 312 of the front sleeve 310 and push the front sleeve 310 along the axis A to reciprocate. The lenses 360 are disposed inside the front sleeve 310 and the rear sleeve 320.

The front sleeve 310 has a plurality of stoppers 318 located between pairs of neighboring grooves 312. The stoppers 318 constrain the range of movement of the sliding components 350. The front sleeve 310 is made of plastic and fabricated in a mold injection process, for example. The grooves 312, the first guiding part 314 and the stoppers 318 are formed simultaneously and no additional process or treatment is needed. Aside from constraining the movement of the sliding components 350, the stoppers 318 also reinforce the structure of the front sleeve 310. In one preferred embodiment of the present invention, the length of each groove 312 may be identical.

In the present embodiment, the first guiding part 314 may be a cylindrical protrusion and the second guiding part 334 can be a guiding groove. Furthermore, the guiding groove extends in a direction parallel to the axis A of the main sleeve 330. The cylindrical protrusion is disposed inside the guiding groove and the cylindrical protrusion slides along a direction parallel to the axis A. Alternatively, the first guiding part 314 can be a guiding groove parallel to the axis A and the second guiding part 334 can be a cylindrical protrusion. In either way, the front sleeve 310 is guided to move in an axial direction relative to the main sleeve 330.

When the driving ring 340 is rotated, the main sleeve 330 and the driving ring 340 smoothly rotate relative to each other through the meshing between the second threads 342 and the first threads 332. In the meantime, the driving ring 340 also pushes the front sleeve 310 along the axis A in a direction either away from the main sleeve 330 or toward the main sleeve 330.

In the present embodiment, the driving ring 340 and the main sleeve 330 may be fabricated using plastic material in a mold injection process. As a result, the first threads 332 and the second guiding part 334 on the main sleeve 330 and the second threads 342 on the driving ring 340 do not need additional process or treatment. Moreover, unlike the conventional metal ring 240 design, grooves are eliminated in the present invention. Thus, problems such as deformation due to additional process or treatment and structural weakening in the presence of grooves are avoided.

It should be noted that the driving ring 340 and the main sleeve 330 are fabricated using an identical material (for example, plastic) and the friction after meshing the first threads 332 and the second threads 342 together is relatively small. Therefore, a user can smoothly rotate the driving ring 340 and abrasion damage to any part due to a difference in the hardness between the driving ring 340 and the main sleeve 330 is minimized.

The sliding components 350 in the present embodiment can be assembled to the driving ring 340 through any method. In the following, one preferred embodiment for assembling the sliding component 350 is described. However, this particular assembling method should not be used to limit the scope of the present invention. In this preferred embodiment, the driving ring 340 has a plurality of through holes 346. The sliding components 350 penetrate through the through holes 346 and protrude from the driving ring 340 into the grooves 312 so that the front sleeve 310 is connected to the driving ring 340. The through holes 346 are threaded holes and the sliding components 350 are screws, for example.

In general, two or more than two sliding components 350 are used so that the driving ring 340 can move stably in the grooves 312 of the front sleeve 310 to push the front sleeve 310 along the axis A. Compared with the number of locking elements (a total of seven) in the conventional design, the present embodiment uses far less locking elements. In other words, the present embodiment reduces the cost and the time for assembling the projection lens 300.

The lenses 360 in the present embodiment includes at least a front lens 362 and at least a rear lens 364. The front lens 362 is disposed inside the front sleeve 310 and the rear lens 362 is disposed inside the rear sleeve 320. In the present embodiment, the rear sleeve 320 can be fabricated using plastic material to reduce cost. Because the front sleeve 310 in the present invention only reciprocates along the A axis of the main sleeve 330, the front lens 362 inside the front sleeve 310 may include a single or multiple of aspherical lenses. Obviously, the front lens 362 can be spherical lens as well. In the present invention, the type of front lens 362 may be selected depends on the actual requirements.

Furthermore, as shown in FIGS. 3A and 3B, the projection lens 300 in the present invention may further include an adjusting rod 370 assembled to the rear sleeve 320. Moving the adjusting rod can adjust the relative position between the main sleeve 330 and the rear sleeve 320 so that the size of the projected image is changed. However, to effectively control the amount of movement in the adjusting rod 370, the main sleeve 330 further includes a guiding groove 380. The guiding groove 380 is a straight groove extending in a direction parallel to the axis A. Moreover, the adjusting rod 370 is suitable for moving inside the guiding groove 380 and changing the relative position between the main sleeve 330 and the rear sleeve 320.

In summary, the projection lens of the present invention includes at least one or more of the following advantages:

1. The first guiding part and the second guiding part effectively minimize assembling time.
2. Through the meshing of the second threads and the first threads, the user can smoothly rotate the driving ring.
3. The driving ring can be fabricated using plastic material in an injection molding process, additional processing or treatment is not required. Hence, thee production cost is reduced.
4. The lens sleeve can be fabricated using plastic material in an injection molding process. Since there is no need to perform additional process or treatment afterwards, deformation of the lens sleeve is avoided. Thus, the reliability of the lens sleeve is improved.
5. The stoppers, in addition to constraining the range of movement of the sliding components, also reinforce the overall structural strength of the front sleeve.
6. The number of locking elements used in the present invention is less than that of the conventional design. Therefore, the production cost of the locking elements and the time for assembling the locking elements are reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens, comprising:
   a front sleeve having a plurality of grooves and a first guiding part, wherein the grooves and the first guiding part are located on an outer surface of the front sleeve;
   a rear sleeve;
   a main sleeve covering the front sleeve and the rear sleeve, wherein the main sleeve has a plurality of first threads and a second guiding part, the first threads are located on an outer surface of the main sleeve and the second guiding part is located on an inner surface of the main sleeve, and the second guiding part engages with the first guiding part, the front sleeve reciprocates along an axis of the main sleeve without rotation;
   a driving ring covering the front sleeve and the main sleeve, wherein the driving ring has a plurality of second threads, and the second threads are located on an inner surface of the driving ring for meshing with the first threads;
   a plurality of sliding components assembled to the driving ring, wherein the sliding components protrude from the driving ring into the grooves so that the sliding components slide inside the grooves of the front sleeve and push the front sleeve along the axis to reciprocate when the driving ring rotates; and
   a plurality of lenses, disposed inside the front sleeve and the rear sleeve.

2. The projection lens of claim 1, wherein the front sleeve has a plurality of stoppers located between pairs of adjacent grooves for constraining the range of movement of the sliding components.

3. The projection lens of claim 1, wherein the first guiding part is a cylindrical protrusion and the second guiding part is a guiding groove that extends in a direction parallel to the axis.

4. The projection lens of claim 1, wherein the second guiding part is a cylindrical protrusion and the first guiding part is a guiding groove that extends in a direction parallel to the axis.

5. The projection lens of claim 1, wherein the driving ring has a plurality of through holes and the sliding components penetrate through the through holes and protrude from the driving ring into the grooves.

6. The projection lens of claim 5, wherein the through holes are threaded holes and the sliding components are screws.

7. The projection lens of claim 1, further comprising an adjusting rod assembled to the rear sleeve, wherein the main sleeve has a guiding groove and the adjusting rod is suitable for moving inside the guiding groove to change the relative position of the main sleeve from the rear sleeve, and the guiding groove is a straight groove that extends in a direction parallel to the axis.

8. The projection lens of claim 1, wherein the material of the front sleeve, the rear sleeve, the main sleeve and the driving ring comprises plastic.

9. The projection lens of claim 1, wherein the lens disposed inside the front sleeve comprises at least one aspherical lens.

* * * * *